Jan. 6, 1970  M. BAERMANN  3,488,536
BISTABLE PERMANENT MAGNET COUPLING SYSTEM
Filed July 9, 1968  2 Sheets-Sheet 1

INVENTOR.
MAX BAERMANN
BY
Meyer, Tilberry & Body
ATTORNEYS

Jan. 6, 1970  M. BAERMANN  3,488,536
BISTABLE PERMANENT MAGNET COUPLING SYSTEM
Filed July 9, 1968  2 Sheets-Sheet 2

INVENTOR.
MAX BAERMANN
BY
Meyer, Tilberry & Body
ATTORNEYS

United States Patent Office 3,488,536
Patented Jan. 6, 1970

3,488,536
BISTABLE PERMANENT MAGNET COUPLING SYSTEM
Max Baermann, 506 Bensberg, Wulfshof, Bezirk Cologne, Germany
Filed July 9, 1968, Ser. No. 743,541
Claims priority, application Germany, Oct. 7, 1967, 1,613,034
Int. Cl. H02k 49/10; H02p 15/00
U.S. Cl. 310—93   10 Claims

ABSTRACT OF THE DISCLOSURE

A coupling system having two stable conditions controllable by electric current pulses of opposite polarity. A movable core made from a magnetically permeable material is interposed between a pair of permanent magnets with magnetically permeable end members which form the first and second air gaps. Electric current pulses electromagnetically pole the movable core member which bridges a first or a second air gap to form a first or a second magnetic circuit, respectively, in order to produce a variable magnetic coupling. The movable core is resiliently biased in either of its bridge positions in order to minimize the amount of current necessary to switch from one stable state to the next.

---

This application pertains to the art of polarized magnet systems controllable by current pulses, and more particularly to controllable hysteresis and eddy current devices.

The invention is particularly applicable to hysteresis or eddy current brakes and clutches controllable by current pulses of short duration and will be described with particular reference thereto, although it will be appreciated that the invention has broader applications, such as for stationary and rotating magnetic chucks, locking devices, valve controls and the like, where a switching position of any duration may be maintained by a relatively short current pulse.

Permanent magnet and electromagnet systems having two or more poles of alternating polarity are presently known. The presently known electromagnet systems include a ferromagnetic core around which a coil has been wound. The coil is energized with direct current in order to form north and south poles in the ferromagnetic core, but the current must be maintained continuously in order for the core to maintain its north and south pole configuration. If the current supply should fail, the core loses its power of attraction or repulsion and the coupling fails.

Permanent magnet systems are free from this inherent disadvantage of electromagnetic systems. Permanent magnet systems, however, are characterized by mechanical switching means, and the mechanical switches must be operated by hand, hydraulically or pneumatically. Such devices generally involve a relatively complex design and are expensive to manufacture.

Among the prior art patents for a permanent magnet system with variable magnetic flux is a device disclosed by me in Patent No. 3,064,149, issued November 13, 1962. In this magnet system, which is most appropriate for use in eddy current brakes or clutches, the permanent magnets have been provided with windings of a small number of turns, and the variation of the total flux to the value of flux required for adjusting the desired degree of brake or clutch coupling is facilitated by magnetizing or demagnetizing the permanent magnets by a corresponding degree of electric current impulses; very high current intensities of short duration are used to provide the degree of magnetization or demagnetization required. These high currents are provided to the system by using a battery of condensers which are charged to the degree required in order to provide these currents.

Another magnetic frictional brake and clutch device has been disclosed by me in Patent No. 2,886,149, issued May 12, 1959, in which a frictional force is caused by permanent magnets which are influenced by coil windings supplied with direct current. The magnetic field developed by the coil windings opposes the field produced by the permanent magnets in order to diminish or completely eliminate the magnetic holding force during the time that the brake or clutch is switched off. The electromagnetically produced counterforce produced by direct current in the coil windings must be maintained during the entire off time, and this requires that this type of system have a relatively high current consumption. This type of system also requires that the counterfields of the electromagnets be limited to a predetermined maximum field strength in order to prevent demagnetization of the permanent magnets.

The purpose of the present invention is to avoid the inherent requirements of the known magnet systems by creating a polarized magnet system of simple design which is controllable by current pulses of relatively small amplitude and short duration. After the condition of magnetic friction is set by the pulse of current, it can be maintained even if the current is interrupted. This provides that, if the system is used as a magnetic brake, the braking action is not interrupted if the current fails.

The present invention contemplates new and improved apparatus which overcomes all of the above-referred to problems and others and provides a bistable magnetic coupling system for brakes and clutches which is simple in design, easy to manufacture and economical to operate.

In accordance with the present invention, there is provided a bistable magnetic coupling system using permanent magnets in conjunction with an electromagnetically poled bridge for switching from one stable magnetic circuit to a second stable magnetic circuit in order to control the magnetic coupling of the system.

In accordance with the invention, a permanent magnet having a positive pole at one end and a negative pole at the other end is provided with a pole shoe transverse to one of its ends. The pole shoe is made from a magnetically permeable material and has an induced polarity corresponding to the polarity of the end of the permanent magnet on which it is placed. A second magnetically permeable member is positioned at the remaining end of the permanent magnet, and has an induced polarity corresponding to the polarity of the permanent magnet, which polarity is opposite from that of the pole shoe. A second permanent magnet has a magnetically permeable pole shoe at one end and a magnetically permeable member at the other, the structure being identical to the first stated permanent magnet except that the polarities at the respective ends of the second permanent magnet are reversed. The magnetically permeable members at the ends of each permanent magnet are mounted on a nonmagnetic support means in a spaced relationship so as to form a first air gap. In this position, the magnetically permeable pole shoes at the other end of each permanent magnet forms a second air gap.

A magnetically permeable movable core and an elongated coil is positioned within the first air gap. When the associated coil is energized by a pulse of current of one polarity the movable core is magnetized to have poles of opposite polarity at each end, and the core is moved upwardly due to the forces of magnetic attraction and repulsion until it forms a magnetic bridge across the second air gap formed by the respective pole shoes. The effect of the magnetic bridge in the second air gap is to shunt the pole shoes, thereby reducing the eddy current braking effect. When a pulse of current having a polarity opposite to that of the first current pulse is applied to the coil winding, the effect is to reverse the induced polarities in the core so that the core is moved downwardly away from the pole shoes until it comes to rest, bridging the first air gap between the magnetically permeable members at the other end of each of the permanent magnets. The bridge formed by the core in this position provides a magnetic circuit to the now unbridged second air gap so as to increase the magnetic coupling braking effect of the system.

The illustrated preferred embodiment of the invention includes a movable core which is resiliently biased by springs which are under compression when the core is in either the first or the second bridging position. When the magnetic polarity of the core is reversed by the pulse of current in the coil, the compression in the springs aids in the movement of the core to the other bridge position. The force of the springs is smaller than the magnetic attraction of the core to the magnetically permeable members in order to preclude movement of the core by the force of the springs alone. It is thus possible to provide control by a current pulse of relatively low intensity because of the resilient biasing of the core which aids the switching movement produced by the magnetic forces. Another advantage of this embodiment is that the springs damp the striking force of the core across either the first or the second air gap when the core is switched. Coil springs provide a preferable damping effect, but damping can also be facilitated by electrically short circuiting the windings of the coil once the pulse of current has been introduced into the coil windings.

Further, in accordance with the invention, the movable core can be pivotally mounted as well as rotatably mounted within the coil winding. The core is provided with recesses at opposite ends in which the coil windings are inserted so that the core is freely movable within the coil windings.

The principle object of the invention is to provide a hysteresis or eddy current brake or clutch device which has two stable states controllable by pulses of current of short duration.

Another important object of the invention is to provide a magnetic coupling system wherein magnetic coupling may be varied by applying pulses of current to respective coils in a predetermined fashion.

A further object of the invention is to provide a controllable and magnet system for stationary and rotating magnetic chucks, braking motors, locking devices, valve controls and the like.

Still another object of the invention is to provide a resiliently biased switching bridge which is poled electromagnetically and which may be pivotally or rotatably mounted within the coil windings of the electromagnet.

Additional objects and advantages of the present invention will become apparent from the following description with reference to the accompanying drawings. The invention may take physical form in certain parts and arrangement of parts, a preferred embodiment which will be described in the specification and illustrated in the accompanying drawings which form a part hereof and wherein.

Figure 1:
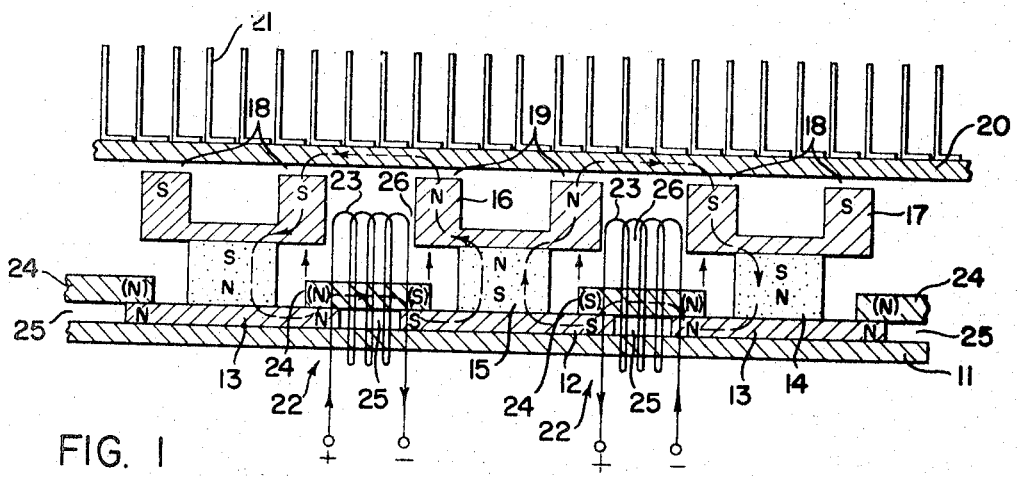
FIGURE 1 is an elevational view in section of an eddy current brake with electromagnetically poled bridges shown in the braking position.
Figure 2:
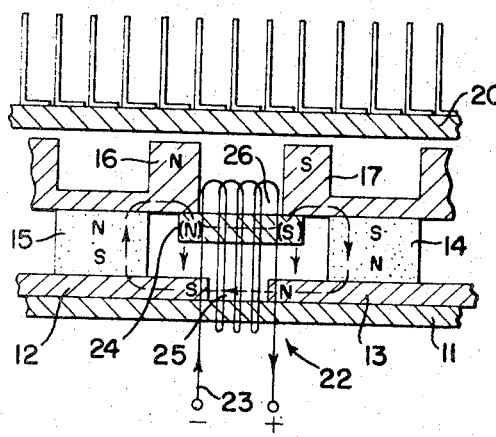
FIGURE 2 is an elevational view in section of an eddy current brake with an electromagnetically poled bridge shown switched to the off braking position.

Referring now to the drawings wherein the showings are for the purpose of illustrating the preferred embodiment of the invention only and not for the purpose of limiting same, FIGURES 1 and 2 show one embodiment of the present invention used for an eddy current brake. In FIGURE 1, a circular base plate 11 of nonmagnetic material supports the magnet system. Magnetically permeable members 12 and 13 are positioned on the base plate 11 so as to form an air gap 25 between adjacent ends. The member 13 supports a permanent magnet 14 which has its north pole contiguous to member 13, and its south pole contiguous to a magnetically permeable pole shoe 17. The effect of the contiguous position of the permanent magnet 14 on the member 13 and pole shoe 16 is to induce a north pole on member 13 and a south pole on pole shoe 17. Member 12 also supports a permanent magnet 15 which in turn supports a pole shoe 16 thereon. It should be noted that the induced polarity in member 12 and pole shoe 16 is opposite to the polarity induced in member 13 and pole shoe 17. This alternation in polarity for each of the adjacent permanent magnets is continued throughout the magnet system.

A second air gap 26 is formed between adjacent ends of pole shoes 16 and 17. It should be noted that a first air gap 25 and a second air gap 26 is typical for each permanent magnet in the magnet system and is continued throughout the system.

An eddy current disc 20 having fan blades 21 is cast from a conductive material in a circular shape and is positioned above pole shoes 17 and 16 to form air gaps 18 and 19, respectively. The air gaps 18 and 19 form part of the magnetic circuit of the magnet system.

In FIGURE 1, an electromagnetically poled bridge assembly 22 is shown bridging the air gap 25 between permeable members 12 and 13. A movable core 24 made from magnetically permeable material bridges the air gap 25. A magnetic circuit path may be traced through the magnet system of FIGURE 1 in order to illustrate how this is the on-condition for eddy current braking. Starting with the centrally located permanent magnet 15, lines of flux move from the south to the north pole through magnet 15, through pole shoe 16, and through air gap 19 onto the surface of eddy current disc 20, through air gap 18, through pole shoe 17, from the south to the north pole of permanent magnet 14, through permeable member 13, then through movable core 24 and through permeable member 12 back to the south pole of permanent magnet 15, which was the starting point. Two important factors should be noted from the magnet circuit traced above. The first is that the magnetic flux in the circuit is threaded through air gaps 19 and 18 in order to complete a magnetic circuit, thereby inducing eddy current in disc 20 in order to provide braking effect. The second factor is that movable core 24 is providing a magnetically permeable path around air gap 25 thereby shunting the reluctance of air gap 25.

The electromagnetically poled assembly 22 also has an elongated coil winding 23 surrounding movable core 24. The coil winding 23 may be pulsed with current in either direction as shown in FIGURES 1 and 2. In order to switch the movable core 24 from one stable position to another, the energizing current pulse must be in such a direction that the induced polarity in the movable core 24 is such as to cause repulsion from one position as well as attraction to the other position. As may be seen in FIGURE 2, the movable core 24 has moved to a second bridge condition across the air gap 26 formed by pole shoes 16 and 17. It should be recognized that the induced magnetic poles at the ends of movable core 24 are now reversed from what they are in FIGURE 1. A second magnetic circuit has been formed with the movable core 24 bridging the air gap 26 rather than the air gap 25, as in FIGURE 1.

Starting with the lines of flux from the south to the north pole of permanent magnet 15, the flux threads through pole shoe 16, through movable core 24, through pole shoe 17, from the south to north pole of permanent magnet 14 through permeable member 13, then through the air gap 25, through permeable member 12 and back to the south pole of permanent magnet 15, which was the starting point. It should be recognized that the second magnetic circuit traced above shunted the air gap 26 with a magnetically permeable core 24 in order to provide a low reluctance path for the magnetic flux across the air gap 26, and therefore reduced the magnetic coupling in air gaps 18 and 19. With the bridge in the position shown in FIGURE 2, the eddy current braking effect on disc 20 is minimal. Thus, switching from an on-brake to an off-brake condition, or the reverse, is done simply by introducing a pulse of current of low magnitude and short duration through the windings of coil 23 in order to create a force of magnetic repulsion and magnetic attraction so as to move a core member 24 from one bridge position to a second bridge position, thereby creating two different magnetic circuit paths to control the magnetic coupling of the system.

A magnet system can provide the desired braking moment by incorporating several magnetic assemblies similar to those shown in FIGURES 1 and 2 having some movable cores 24 in a switched on position and some of them in a switched off position. The maximum braking moment in this type of magnet system is achieved by switching all of the movable cores 24 from the brake-off condition to the brake-on condition, i.e., from the position shown in FIGURE 2 to the position shown in FIGURE 1.

The magnet system of the invention may be either a rotating magnet system or a stationary magnet system. When used as a rotating magnet system, provision is made to hold the movable core 24 against the inherent centrifugal forces. A rotary magnet system is used for water cooled eddy current brakes where the eddy current disc 20 can be connected to the coupling system of a vehicle. In an air cooled eddy current brake, the eddy current disc 20 generally rotates, and the magnet system is stationary.

Figure 3:
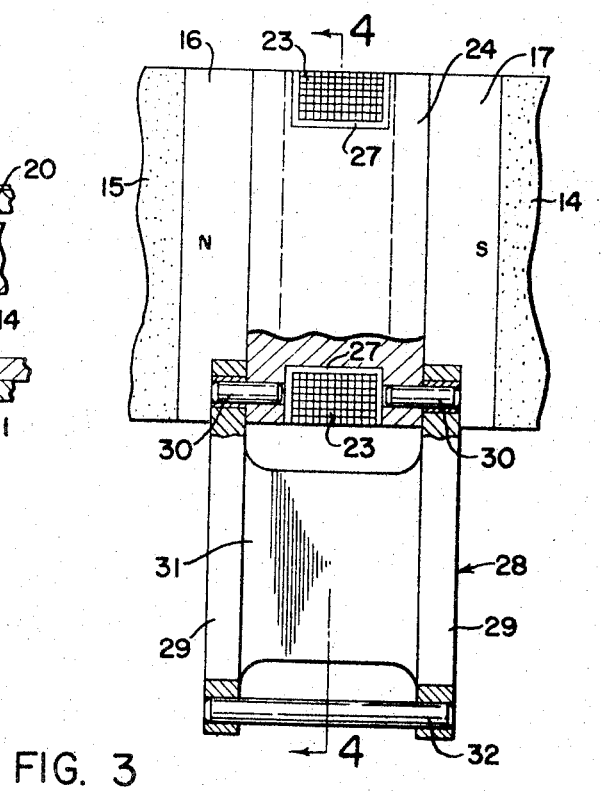
FIGURE 3 is an enlarged plan view, partially in section, of an eddy current brake having a pivotally mounted movable core.
Figure 4:
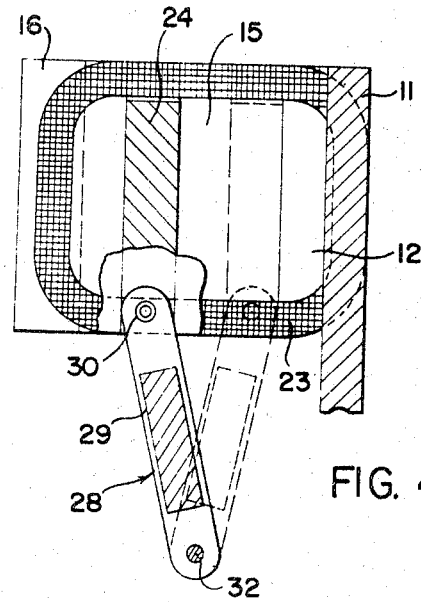
FIGURE 4 is a side elevational view in section along the line 4—4 in FIGURE 3 with the movable core bridging a second air gap in one position and bridging a first air gap in the dashed position.

Considering the need for a holding structure for the movable core 24 with respect to a stationary magnet system, reference should be made to FIGURES 3 and 4. A recess 27 has been provided at each end of the movable core 24 in order to accommodate coil windings 23, as seen in cross section from above in FIGURE 3. Permanent magnets 14 and 15 having pole shoes 17 and 16, respectively, are shown proximately related to movable core 24. At one end of movable core 24 a core holder 28 has been pivotally attached by pivot pins 30. The structure of core holder 28 includes two pivot members 29 with a web member 31 interposed therebetween and a vertically fixed pivot pin 32 at the external end of the pivot members 29 which is transverse to their longitudinal axis. FIGURE 4 shows how the movable core 24 is constrained to substantially vertical motion when moving from a first magnetic circuit condition to a second magnetic circuit condition. The motion of core pivot pin 30 in moving from a first position to a second position defines an arcuate segment. A core holder 28 may be fastened to the base plate 11 by means of conventional angular parts. The only critical limitation on the design of the core holder is that the movable core 24 be free to move inside the coil winding so that it may fully bridge the air gap 25 and the air gap 26.

Figure 5:
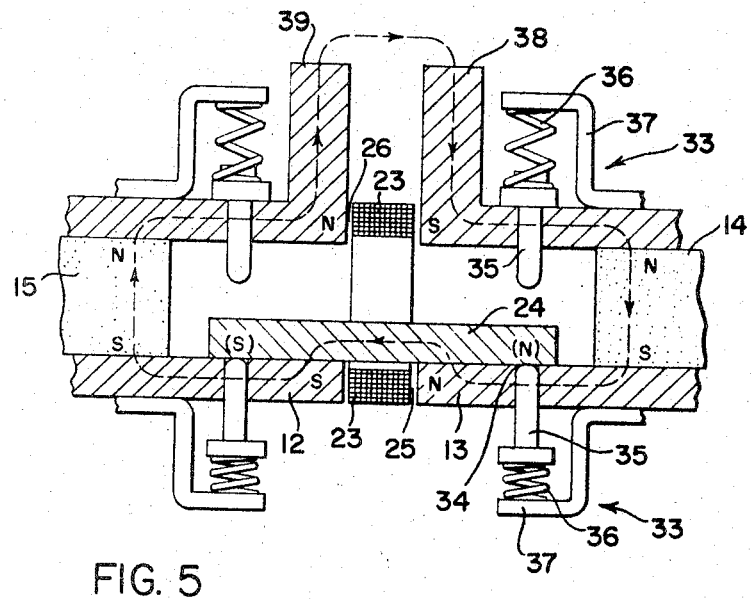
FIGURE 5 is an elevational view of the preferred embodiment, partially in section, where the movable core is resiliently biased bridging a first air gap; and, FIGURE 6 is an elevational view in partial section of a reversible magnet system with the core bridging one of the air gaps.

A preferred embodiment of this invention is shown in FIGURE 5. In FIGURE 5 a pair of alternately poled permanent magnets 14 and 15 are sandwiched between magnetically permeable members in order to form a first air gap 25 and a second air gap 26. A movable core 24 is shown bridging the first air gap 25. The movable core 24 is resiliently biased by a bias assembly 33. The bias assembly 33 is identical for the permeable members 12 and 13 forming the air gap 25 as well as for the pole shoes 38 and 39 forming the air gap 26. The bias assembly 33 includes a nonmagnetic damping bolt 35 free to move through a bore 34 in the permeable members 12, 13, 38 and 39, a compression spring 36 and a spring retainer 37 fastened to the external surface of each of the above designated permeable members. The spacing between the respective bias assemblies 33 is such that the damping bolts 35 come in contact with the movable core 24 so as to provide spring damping to the motion of the movable core 24 as it moves from one bridging position to the next. The damping force of the compression springs 36 is less than the magnetic power of attraction between the movable core 24 and the induced magnetic poles of the permeable members.

The advantage of providing a bias assembly 33, as shown in FIGURE 5, is that the movable core 24 may be switched from one position to the other by a current pulse of low intensity because the repulsive force induced in the movable core 24 by the pulse of current in the coil is additive to the compression force of the spring 36 which has been compressed by the movable core 24.

Figure 6:
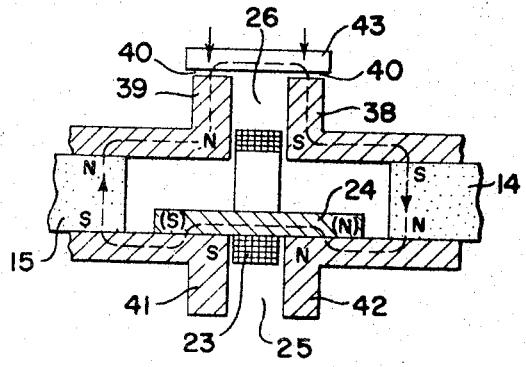

A reversible magnet system according to the invention is shown in FIGURE 6. Two permanent magnets 14 and 15 are sandwiched between upper pole shoes 38 and 39 and lower pole shoes 41 and 42. The lower pole shoes 41 and 42 define an air gap 25, and upper pole shoes 38 and 39 define an air gap 26. A movable core 24 is shown bridging the air gap 25, and elongated coil winding 23 is positioned in the air gaps 25 and 26 about the movable core 24. A ferromagnetic bridge 43 is separated from the upper pole shoes 38 and 39 by coupling air gap 40.

The operation of this magnet system is similar to the operation described for the preceding embodiments. When the movable core 24 bridges air gap 25, a magnetic circuit is formed which includes magnetic flux threading through the air gaps 40 to the ferromagnetic part 43, which causes the part 43 to adhere to pole shoes 38 and 39. When the movable core 24 is energized by passing a pulse of current through the coil windings 23, the movable core 24 will bridge the air gap 26 across pole shoes 38 and 39 and the ferromagnetic part 43 is released due to the shunting effect of movable core 24 in the air gap 26. When the air gap 26 is bridged, a ferromagnetic part spanning the air gap 25 between the lower pole shoes 41 and 42 would be attracted by the magnetic flux in the air gap, and the ferromagnetic part would be attracted to the pole shoes 41 and 42 as long as the movable core 24 bridges the air gap 26. The movable core position can then be reversed with a current pulse of opposite polarity in order to obtain the initial magnetic coupling condition. The embodiment of FIGURE 6 can be used as either an eddy current brake or an eddy current clutch.

The invention has been described with reference to the preferred embodiments. Obviously modifications and alterations will occur to others upon the reading and understanding of this specification. It is my intention to include all such modifications and alterations insofar as they come within the scope of the appended claims or the equivalence thereof.

What is claimed is:

1. A bistable magnet coupling system controlled by current pulses, said system comprising:
 a nonmagnetic support means;
 at least one pair of magnetically permeable members superposed to said support, one end of each said member forming a first air gap with said adjacent member;
 a two pole permanent magnet superposed on each said permeable member, each said permanent magnet having a first pole contiguous to each said permeable member, said first poles being of alternate polarity;
 a magnetically permeable pole shoe member contiguous to the remaining pole of each said permanent magnet, each said shoe member forming a second air gap with said adjacent shoe member, said second air gap being substantially aligned with said first air gap;

electromagnetically poled bridge means for bistable switching including a movable magnetically permeable core member and a coil means associated with each of said first air gaps, said core member forming a first and a second magnetic circuit bridge position, said coil means being energized with a pulse of current of one polarity to cause said core member to magnetically bridge said second air gap, and said coil means being energized with a pulse of current of reverse polarity to cause said core member to magnetically bridge said first air gap.

2. The magnet coupling system of claim 1, wherein said bridge means includes a holding means pivotally mounted at a first end to said core member, to restrain movement of said core member substantially between said first and second magnetic circuit bridge positions.

3. The magnet coupling system of claim 2, wherein said holding means is pivotally mounted in a fixed position at the opposite end so that the motion of said first pivoted end defines an arcuate segment when said core member is moved between said first and second magnetic circuit bridge positions.

4. The magnet coupling system of claim 1, wherein said coil means is elongated and is positioned substantially within said air gap, said movable core member is pivoted along the longitudinal axis of said elongated coil means so that rotary motion coupled to said core member may be transmitted when said rotary core member is moved to one of said magnetic circuit bridge positions.

5. The magnet coupling system of claim 4, wherein said bridge means includes a resilient bias means for biasing and damping the movement of said core member from or to said magnetic circuit bridge positions.

6. The magnet coupling system of claim 5, wherein said resilient bias means includes a spring, a nonmagnetic pressure bolt interposed between one end of said spring and said core member, and a spring housing means for preventing relative motion of the remaining end of said spring.

7. The magnet coupling system of claim 6, wherein said bridge means includes a means for confining the interim movement of sad core member, from either of said magnetic circuit bridge positions to the other, to substantially the region of the magnetic circuit bridge positions.

8. A reversible magnet clutch for coupling rotating shafts controlled by current pulses, said system comprising:

a first and second ferromagnetic disc spaced from each other and axially aligned;

a first pair of magnetically permeable pole shoe members forming a first air gap with each other and a first coupling air gap with said first ferromagnetic disc;

a second pair of magnetically permeable pole shoe members forming a second air gap with each other and a second coupling air gap with said second ferromagnetic disc, said second air gap being substantially aligned with said first air gap;

a two pole permanent magnet interposed between one of said first pair of shoe members and another of said magnets interposed between said remaining shoe members of said first and second pair, each said magnet having magnetic poles contiguous to said shoe members, said polarity being oppositely oriented for each said magnet;

an electromagnetically poled bridge means for bistable switching, said bridge means including a movable magnetically permeable core member and a coil means associated with said first air gap, said core member forming a first and a second magnetic circuit bridge position, said coil means being energized with a pulse of current of one polarity to cause said core member to magnetically bridge said second air gap, and said coil means being energized with a pulse of current of reverse polarity to cause said core member to magnetically bridge said first air gap.

9. The reversible magnet clutch of claim 8, wherein said coil means is elongated and is positioned substantially within said first and second air gaps.

10. The reversible magnet system of claim 9, wherein said bridge means includes a resilient means for biasing and damping the movement of said core members from or to said magnetic circuit bridge positions.

References Cited

UNITED STATES PATENTS

| | | | |
|---|---|---|---|
| 2,700,744 | 1/1955 | Simmons | 335—295 |
| 3,068,372 | 12/1962 | Bell | 310—93 |

DAVID X. SLINEY, Primary Examiner

U.S. Cl. X.R.

310—105